(12) United States Patent
Shaffer et al.

(10) Patent No.: US 6,731,734 B1
(45) Date of Patent: May 4, 2004

(54) APPARATUS AND METHOD FOR INTELLIGENT CONFERENCE CALL CODEC SELECTION

(75) Inventors: Shmuel Shaffer, Palo Alto, CA (US); William Joseph Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/377,895

(22) Filed: Aug. 19, 1999

(51) Int. Cl.$^7$ .............. H04M 3/56; H04Q 7/30
(52) U.S. Cl. .............. 379/202.01; 379/207.01
(58) Field of Search .............. 379/201.01, 202.01, 379/206.01, 207.01, 220.01, 221.06, 221.07, 243

(56) References Cited

U.S. PATENT DOCUMENTS

| | | | | |
|---|---|---|---|---|
| 5,546,395 A | | 8/1996 | Sharma et al. .............. 370/84 |
| 5,570,363 A | * | 10/1996 | Holm .............. 370/62 |
| 5,600,646 A | * | 2/1997 | Polomski .............. 370/263 |
| 5,729,684 A | * | 3/1998 | Kuzma .............. 395/200.34 |
| 5,757,781 A | * | 5/1998 | Gilman et al. .............. 379/201.01 |
| 5,761,634 A | * | 6/1998 | Stewart et al. .............. 704/220 |
| 5,774,674 A | * | 6/1998 | Gutmann et al. .............. 379/202 |
| 6,049,537 A | * | 4/2000 | Proctor et al. .............. 370/242 |
| 6,175,856 B1 | * | 1/2001 | Riddle .............. 709/204 |
| 6,240,070 B1 | * | 5/2001 | Kozdon et al. .............. 370/260 |
| 6,308,222 B1 | * | 10/2001 | Krueger et al. .............. 709/247 |

FOREIGN PATENT DOCUMENTS

| | | | |
|---|---|---|---|
| EP | 1 024 638 | 8/2000 | .............. H04L/29/06 |
| WO | WO 95/22818 | 8/1995 | .............. G10L/9/00 |
| WO | WO 00/33590 | 6/2000 | .............. H04Q/7/30 |

* cited by examiner

Primary Examiner—William J Deane, Jr.

(57) ABSTRACT

A multipoint control unit (104) is provided which allows for dynamic codec selection. According to one embodiment, the MCU (104) causes endpoints (102, 106) to renegotiate their codec selections if a most-commonly available codec is not being used, upon entry of new parties to a teleconference. Alternatively, the codec renegotiation may be performed each time a user speaks, to optimize for maximum transmission quality or for minimizing transcoding.

17 Claims, 7 Drawing Sheets

APPARATUS AND METHOD FOR INTELLIGENT CONFERENCE CALL CODEC SELECTION

BACKGROUND OF THE INVENTION

The present invention relates to telecommunications systems and, particularly, to an improved system and method for multimedia conferencing.

The ITU-T (International Telecommunications Union Telecommunications Sector) Recommendation H.323 defines a set of protocols for communicating using audio, video and data over packet-switched networks. To accommodate multipoint conferences (i.e., those involving three or more parties), the Recommendation H.323 defines a multipoint control unit (MCU) to coordinate the conferencing. In particular, the MCU is required by the Recommendation H.323 to include a multipoint controller (MC), which handles H.245 signaling. In addition, the MCU may include one or more multipoint processors (MP), which mix and process the data streams.

The MPs may also provide conversion, or transcoding, between different codecs. However, typical MPs transmit at the highest quality codec each user will support, whether or not it is necessary. For example, if someone with a high quality G.711 codec is talking, using the "best codec" method allows everyone to receive the voice with the highest possible quality from the codec. However, if someone with a lower quality codec (e.g., G.723) is speaking, their voice is distributed to the G.711 users with G.711, which is wasteful.

Figure 1A:
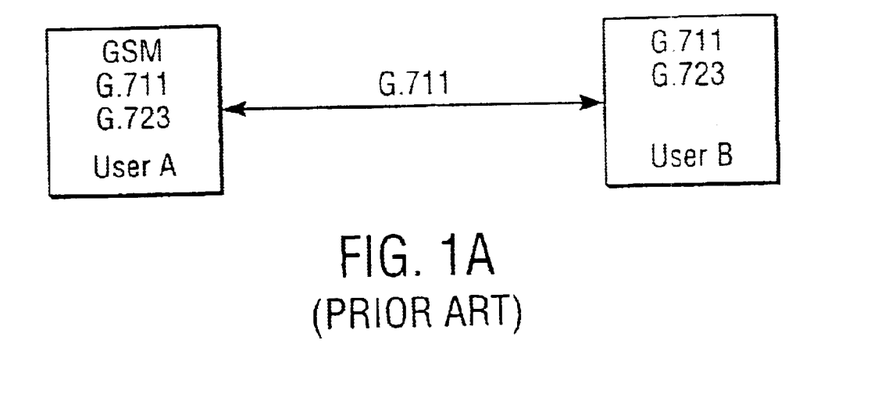
FIG. 1A and FIG. 1B illustrate operation of an MCU according to the prior art.
Figure 1B:
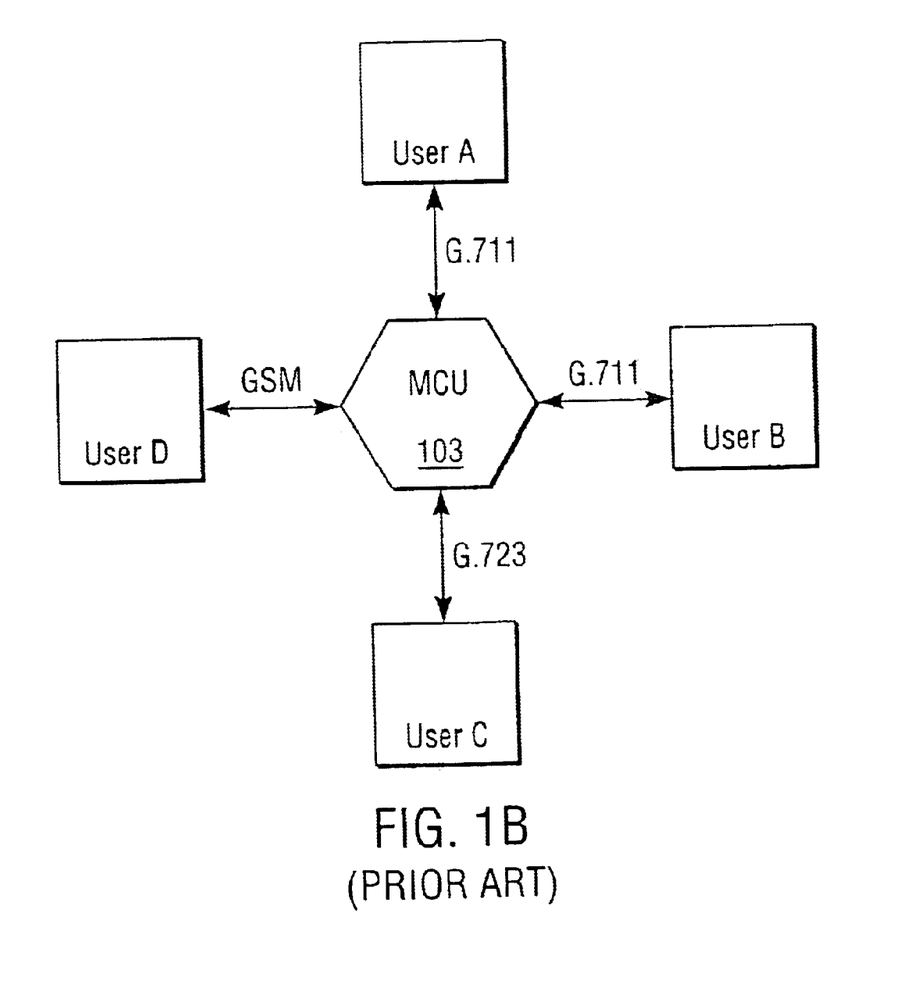

This process is illustrated schematically by way of an example in Table 1 and FIGS. 1A and 1B. In the example shown in Table 1, User A has GSM, G.723, and G.711 capabilities; User B has G.711 and G.723 capabilities; User C has G.723 capabilities; and User D has GSM capabilities.

TABLE 1

| User A | User B | User C | User D |
|--------|--------|--------|--------|
| GSM    | G.711  | G.723  | GSM    |
| G.711  | G.723  |        |        |
| G.723  |        |        |        |

As shown in FIG. 1A, if User A communicates in a two-party conference with User B, G.711 will be used, if possible. If not, then the G.723 codecs will be used. Then, suppose User B calls User C and conferences in User C using the conference feature. The codec choice is negotiated and the MCU 103 is inserted into the media stream to provide transcoding. As shown in FIG. 1B, the MCU 103 communicates with User A and User B using G.711, and with User C using G.723. If a User D having only GSM is added to the conference, then MCU 103 will communicate with the User D using only GSM.

The amount of transcoding the MCU 103 must do depends upon which party is talking. When User A talks, User B receives the signal as is, and User C and User D require transcoding. When User B talks, User A receives the signal as is, and User C and User D require transcoding. When User C talks, Users A, B and D require transcoding. When User D talks, Users A, B, and C require transcoding.

The prior art thus is disadvantageous in that the MCU is required to perform transcoding which may be sub-optimal or even unnecessary. As such, the prior art MCUs can waste processing resources.

SUMMARY OF THE INVENTION

These and other drawbacks in the prior art are overcome in large part by a multipoint control unit (MCU) according to the present invention. According to one implementation, the MCU determines an optimal codec, for example, based on a highest quality "most common codec" among parties to a multipoint conference. Alternatively, the optimal codec may be chosen to minimize transcoding. The MCU instructs any parties not using that codec to renegotiate their connections with the MCU to employ that codec. The determination is made as each party is added to the multipoint conference.

According to another embodiment, the codec optimization is made every time a different party talks. As each party is identified, the MCU issues commands to renegotiate the connections with the endpoints. Again, the codec may be chosen to maximize quality or to minimize transcoding.

According to another embodiment, a particular party is chosen as having a default codec. That party is chosen as being allowed its highest quality codec, with other parties receiving at their highest qualities possible. However, when the other parties transmit, they send with a lower quality codec to preserve bandwidth.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 2–10 illustrate an improved multipoint conferencing system and method. The present invention provides for more optimal selection of codecs in a multipoint control unit. Optimal selection of codecs may be based on minimizing bandwidth use, minimizing transcoding, or maximizing transmission quality. Moreover, such optimization may occur either as new users are added to the multipoint conference, or as particular users begin speaking. Finally, one or more users may be assigned a fixed higher or lower quality codec throughout the conference.

Figure 2:
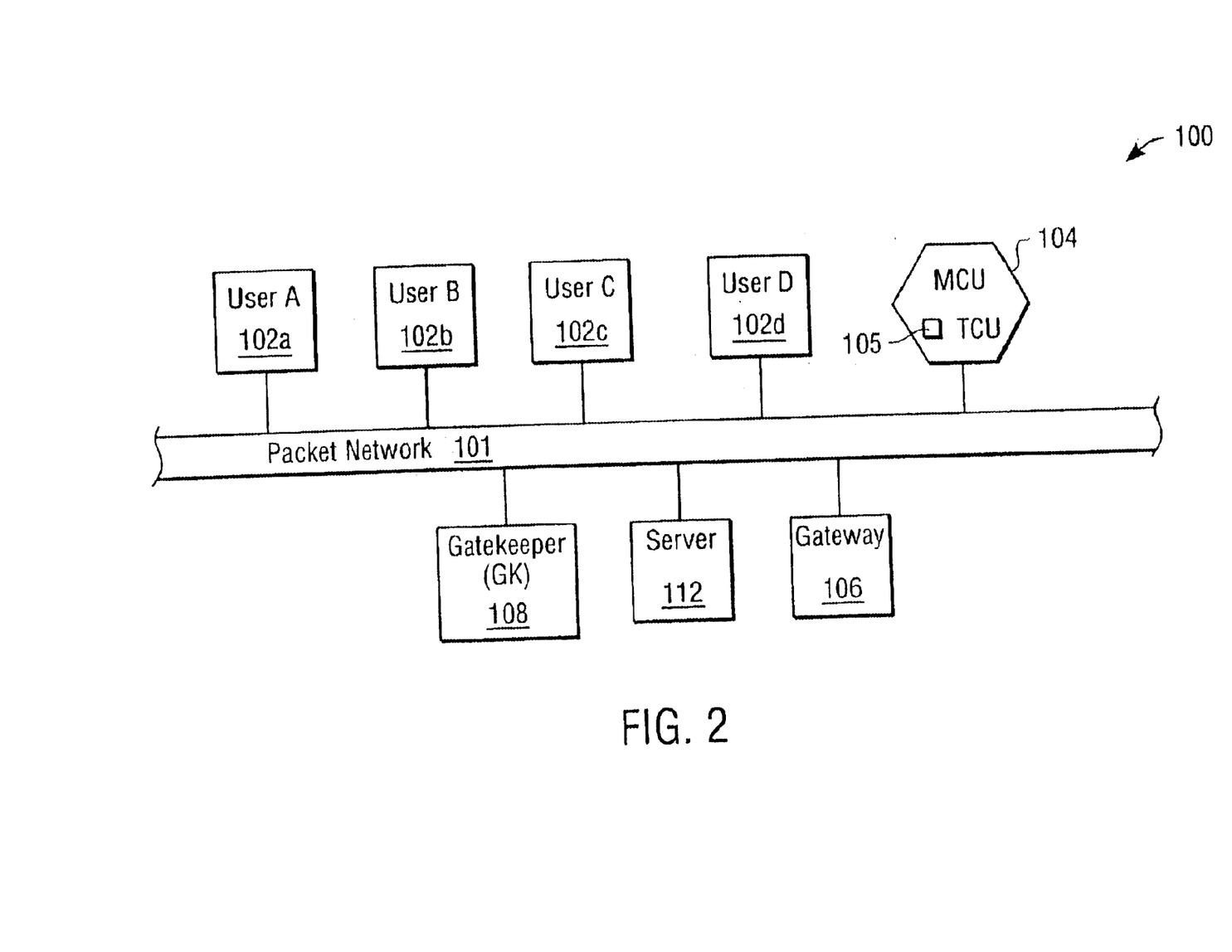
FIG. 2 illustrates a telecommunications network according to an embodiment of the invention.

Turning now to the drawings, and with particular attention to FIG. 2, a diagram illustrating an exemplary H.323 telecommunications system 100 according to an embodiment of the present invention is shown. It is noted that, while described specifically in the context of voice packets, the present invention encompasses the use of any multimedia information, such as video, data, voice, or any combinations thereof. Moreover, an exemplary generic H.323 system is the Siemens HiNet™ RC 3000 system available from Siemens.

The telecommunications system 100 includes a local area network (LAN) or packet network 101. Coupled to the LAN 101 may be a variety of H.323 terminals 102a, 102b, 102c, 102d, a multipoint control unit (MCU) 104 according to the present invention, an H.323 gateway 106, an H.323 gatekeeper 108, a LAN server 112 and a plurality of other devices such as personal computers (not shown). The H.323 terminals 102a, 102b, 102c, 102d and H.323 gateway 106 and H.323 gatekeeper 108 are in compliance with the H.323 Recommendation. H.323 terminals 102 and H.323 gateway 106 are each "endpoints" as may be discussed below. The H.323 endpoints support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 endpoints may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein.

Figure 3:
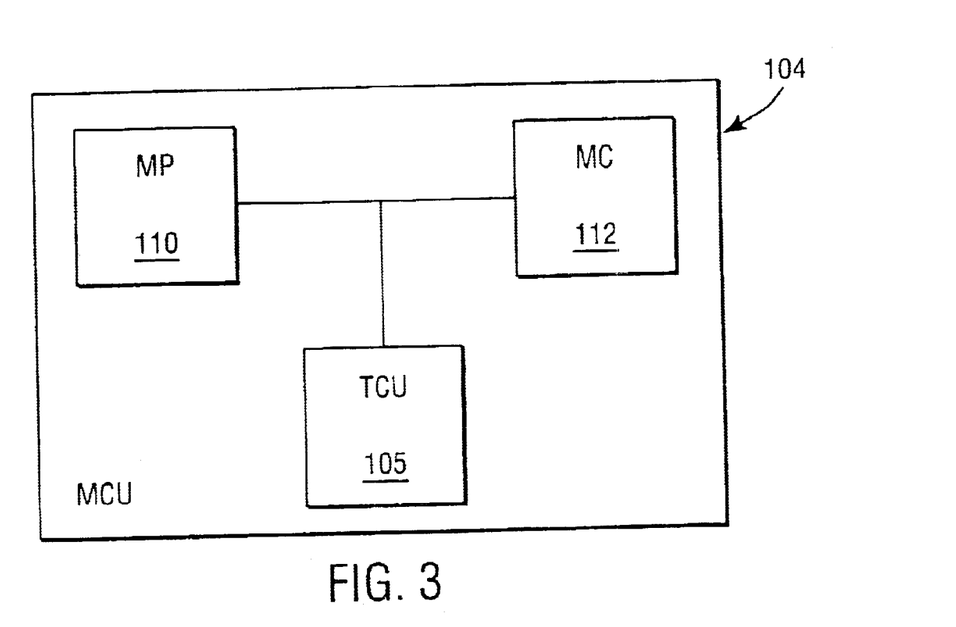
FIG. 3 illustrates a multipoint control unit according to an embodiment of the invention.

The MCU 104 includes a Transcoding Control Unit (TCU) 105 according to the present invention. As shown in FIG. 3, the TCU 105 is coupled to a Multipoint Processor (MP) 110 and a Multipoint Controller (MC) 112. The MP 110 performs the actual media signal processing, i.e., switching, and the like. The MC 112 handles H.245 capability negotiations to determine existence of a common codec. As will be explained in greater detail below, the TCU 105 provides for more optimal selection of the codec which is to be used. The TCU 105 is programmed with the codec information for each of the users. When the conference is set up, the TCU 105 determines what common codec, if any, each of the parties possess, and causes a signaling message, RenegotiateCodec, to be relayed to parties to the conference that they will have to use the common codec. If they are not currently using the common codec, they will need to renegotiate this portion of the call set-up with the MCU 104. It is noted that, while shown as discrete units, the MC 112, MP 110 and TCU 105 may be embodied as one or more integrated processors. Thus, the figures are exemplary only.

Figure 4:
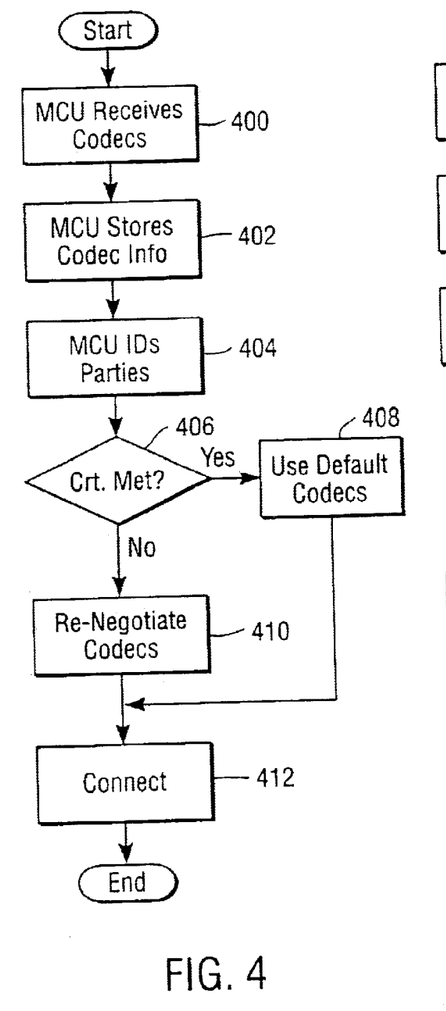
FIG. 4 is a flowchart illustrating operation of an embodiment of the invention.

Turning now to FIG. 4, a flowchart illustrating general operation of the present invention is shown. First, in a step 400, the MCU 104 receives codec setup information concerning each of the parties on the network. The TCU 105 stores this information in a database (not shown), in a step 402. During a multipoint conference, the MCU 104 identifies the parties and accesses the database for their codec information, in a step 404. If predetermined optimization criteria are met through use of the default codecs, then in a step 408, the connections (in step 412) are negotiated using the defaults. As will be discussed in greater detail below, the optimization criteria may include minimizing transcoding, maximizing quality, or other desired criteria. Turning back to FIG. 4, if the optimization criteria are not met, then in a step 410, the MCU 109 and particularly, the TCU 105 instructs the codecs of all concerned parties that the connections (in step 412) are to be renegotiated for optimal codec usage.

Figure 5:
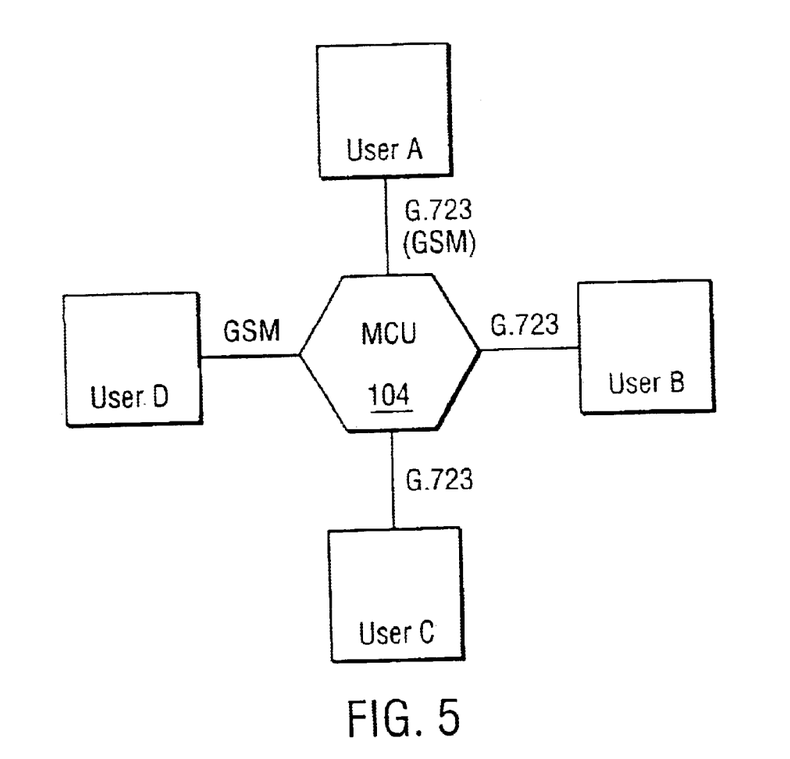
FIG. 5 is a diagram schematically illustrating operation of an exemplary implementation of the invention.

A first embodiment of the invention is illustrated schematically by way of example with reference to FIG. 5. In the example of FIG. 5, the optimal coding choice to minimize transcoding is made every time a new user is added. In this example, the users have the coding capabilities as set forth in Table 1. Thus, User A has GSM, G.723, and G.711 capabilities; User B has G.711 and G.723 capabilities; User C has G.723 capabilities; and User D has GSM capabilities.

If User A communicates with User B, G.711 will be used, if possible. If not, then the G.723 codecs will be used. Then, suppose User B calls User C and conferences in User C using the conference feature. The codec choice is then renegotiated on the fly as shown in FIG. 5. That is, User A will now communicate with the MCU 104 using G.723, User B will communicate with MCU 104 using G.723, and User C will communicate with the MCU 104 using G.723. Thus, in the example of FIG. 5, the User A and the User B will need to renegotiate (from G.711 to G.723). Once this is done, no transcoding is needed because all the codecs are G.723.

Next, if a User D is added to the conference, the MCU 104 will communicate with it using GSM, since that is the only codec supported by the User D. If GSM is preferred by the MCU, then User A could be required to renegotiate the connection using GSM.

As can be appreciated, depending on which party is talking, the MCU 104 may have little or no transcoding to do. When User A talks G.723 coding, User B and C receive the signal as is, and User D requires transcoding. When User B talks, Users A and C receive the signal as is, and User D requires transcoding. When User C talks, Users A and B receive the signal as is, and User D requires transcoding. When User D talks, Users A, B, and C all require transcoding. Nevertheless, the amount of transcoding needed is less than in the case of FIGS. 1A–1B. Moreover, in this embodiment, when each party is added, the optimal coding choice to minimize transcoding is made. For example, if Users E, F, and G were added, all with only GSM capabilities, then User A would be switched to GSM, since a majority of the users support GSM rather than G.723.

Figure 6:
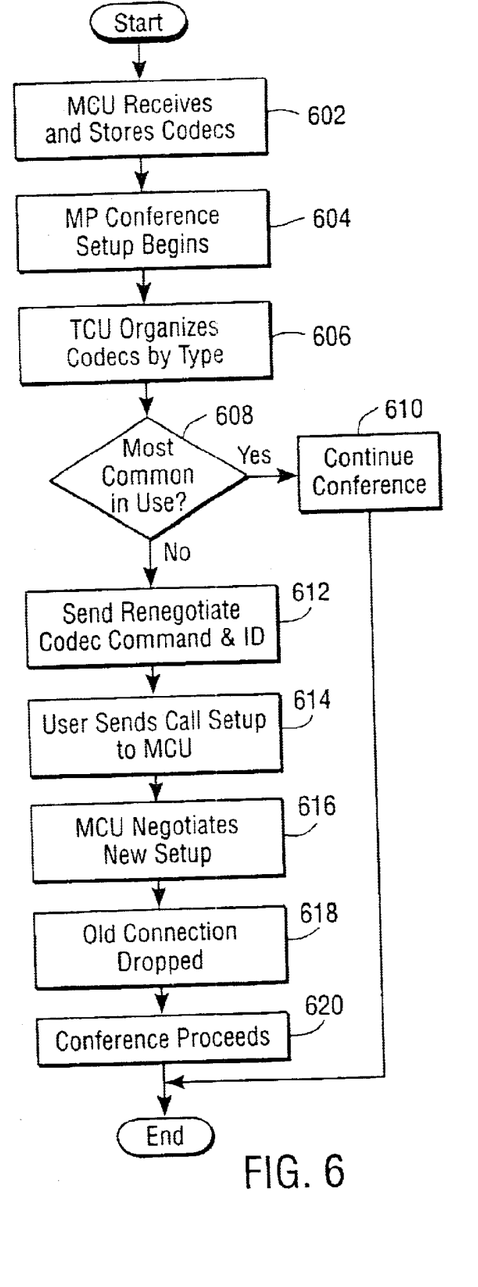
FIG. 6 is a flowchart illustrating operation of an embodiment of the invention.

A flowchart illustrating operation of this embodiment is shown in greater detail with reference to FIG. 6. In a step 602, the MCU 104 and, in particular, the TCU 105 receives information concerning endpoints on the network and their coding capabilities and stores them in a memory or database (not shown). In a step 604, the MCU 104 and, particularly, the MC 112, receives the multipoint conference call set-up commands, including identification of the users and their requested codecs. In a step 606, the TCU 105 receives the identification and codec requests, and accesses the user-codec database to organize the users by type of codec and determine the most common codec. In certain instances, a quality "floor" or threshold may also be provided. Next, in a step 608, the TCU 105 determines whether the most common codec is in use or has been requested by all the users to the conference. If so, then the conference will proceed, in a step 610. If not, then in a step 612, the TCU 105 will cause the MC 112 to issue a RenegotiateCodec command to the relevant users. The RenegotiateCodec command may include, as a parameter, an identification of the particular codec which is to be used. In a step 614, the relevant user sends a call setup command which is received by the MCU 104's MC 112. The MC 112 recognizes the call setup command as pertaining to the particular conference and, in a step 616 undertakes the appropriate H.323 call control and signaling commands to set up the new connection using the new codec. Once the new connection has been established, in a step 618, the old connection is dropped. Finally, in a step 620, the conference proceeds using the new codec selections.

Figure 7A:
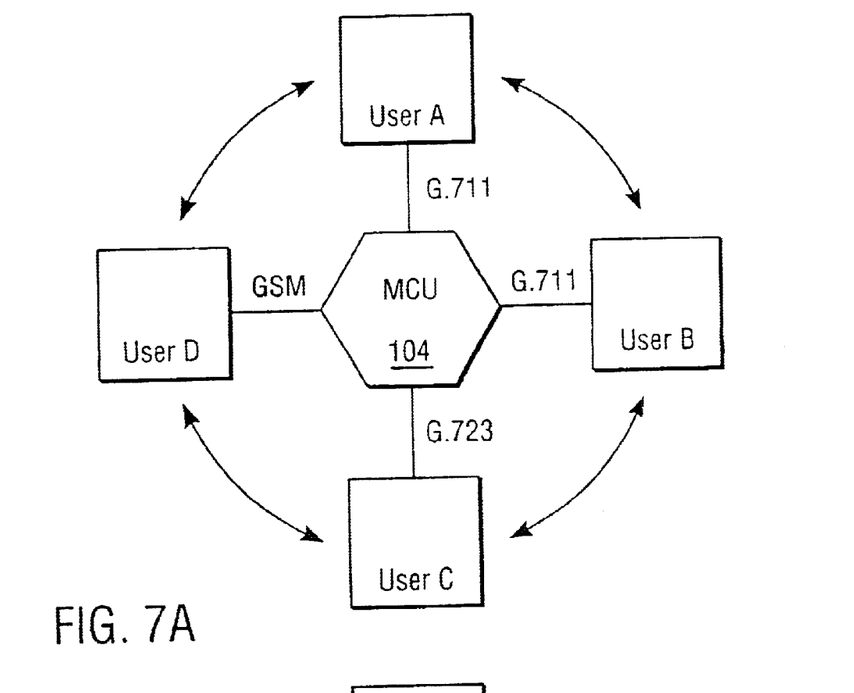
FIG. 7 is a diagram schematically illustrating operation of an exemplary implementation of the invention.
Figure 7B:
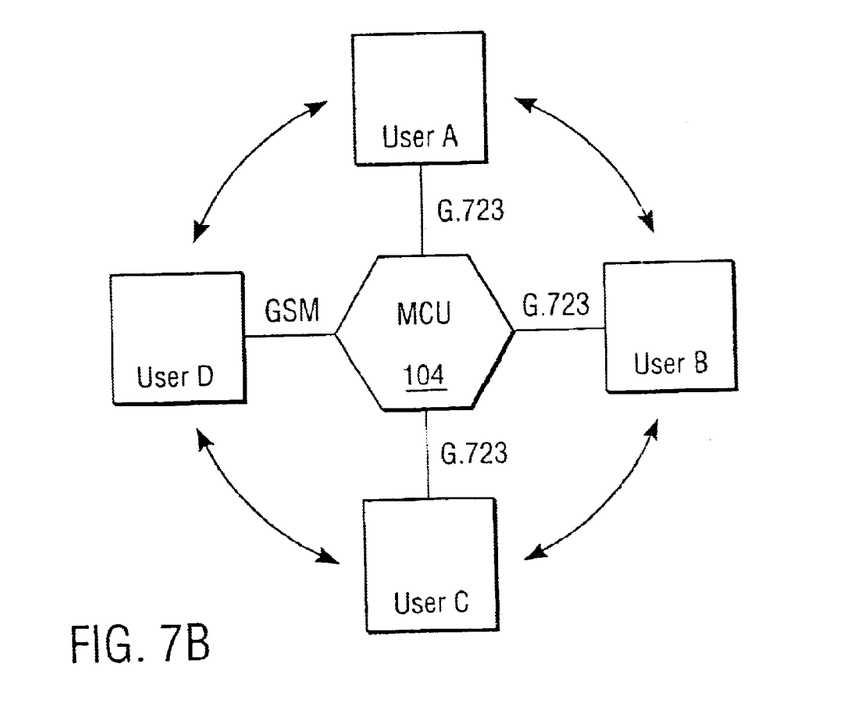

The embodiment described above modifies the coding choice as parties are added and dropped from the conference. In a second embodiment, however, the coding choice is modified every time a different party talks. Thus, every time a new party talks, that party is identified as the dominant party by the MCU 104 and the MCU 104 issues the proper signals to renegotiate the rates with the endpoints. For example, turning to FIG. 7A, the example of Table 1 is again used. If User A is talking in a conference involving Users A, B, C, and D, then the connections should appear as in FIG. 7A, if the quality of the connection is to be maximized. That is, the Users A and B communicate with the MCU 104 using G.711; the User C communicates with the MCU 104 using G.723; and the User D communicates with the MCU 104 using GSM. Alternatively, if transcoding is to be minimized, then the connections will be as shown in FIG. 7B. Thus, Users A, B, and C all communicate with the MCU using G.723; and User D communicates using GSM.

Figure 8:
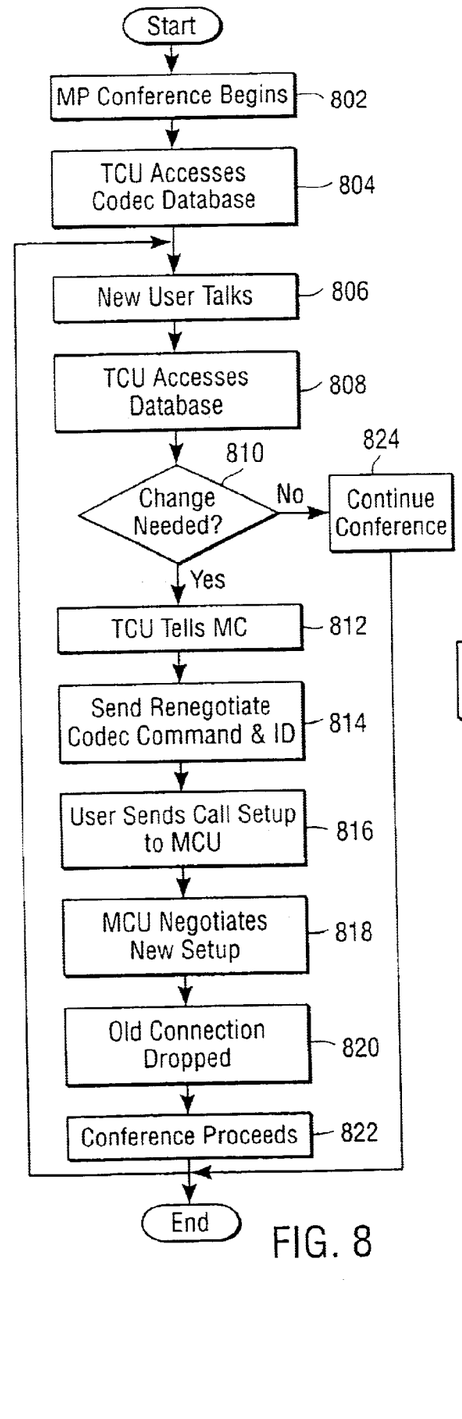
FIG. 8 is a flowchart illustrating operation of an embodiment of the invention.

A flowchart illustrating this embodiment of the invention is shown in FIG. 8. In a step 802, the multipoint conference is set up via the MCU 104. In a step 804, the TCU 105 receives the user identification and codec requests, and accesses the user-codec database. In a step 806, the TCU 105 detects a new user talking. In response, in a step 808, the TCU 105 accesses the database to determine whether codec usage is optimized. As discussed above, codec usage may be optimized to maximize quality of minimize transcoding. Next, in a step 810, the TCU 105 determines whether any of the users must renegotiate their codecs for optimization. If not, then in a step 824, the conference proceeds. However, if they do, then in a step 812, the TCU 105 sends an identification of the user to the MC 112. The MC 112 will issue a RenegotiateCodec command to the relevant users in a step 814. The RenegotiateCodec command may include, as a parameter, an identification of the particular codec which is to be used. In a step 816, the relevant user sends a call setup command which is received by the MCU 104's MC 112. The MC 112 recognizes the call setup command as pertaining to the particular conference and, in a step 818, undertakes the appropriate H.323 call control and signaling commands to set up the new connection using the new codec. Once the new connection has been established, in a step 820, the old connection is dropped. Finally, in a step 822, the conference proceeds using the new codec selections, until a new user talks and the system cycles back to step 806.

Figure 9:
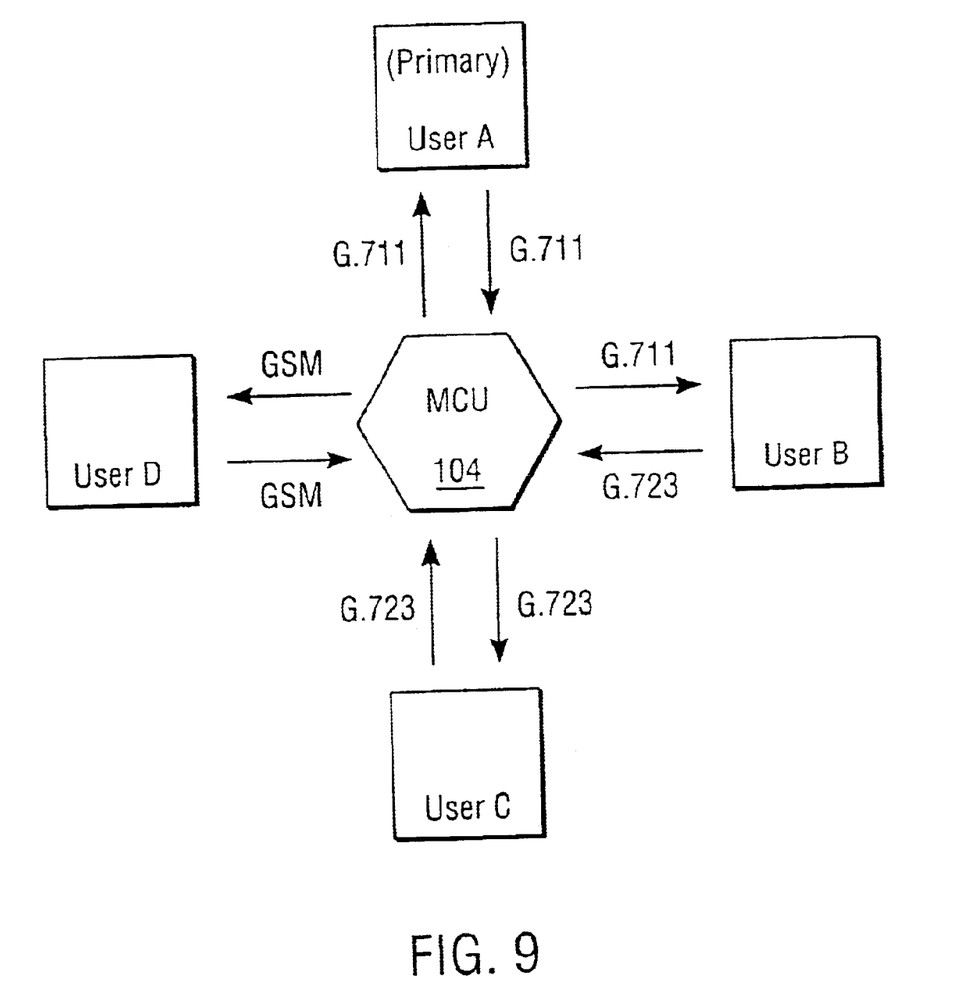
FIG. 9 is a diagram schematically illustrating operation of an exemplary implementation of the invention.

In another embodiment of the invention, the MCU 104 is configured to receive an identification of a particular user as a primary user; all others are identified as secondary. For example, in a teacher/lecturer environment, it may be desirable to provide the teacher with the highest quality codec when speaking, but the students with a lower quality one when questioning. In this case, the MCU 104 will cause the connection from the primary user and to the secondary users to be the highest quality possible. The connection from the secondary users will be at a lower quality, to preserve system bandwidth. For example, assume that user capabilities are as defined in Table 1. If User A is chosen as the primary user, then its connection to the MCU 104 will be made using G.711. As shown in FIG. 9, the MCU 104 will communicate to the Users B, C and D using their highest quality codecs: G.711, G.723, and GSM, respectively. However, the Users B, C, and D will communicate to the MCU using a lower quality codec, if supported. Thus, User B will communicate to the MCU with G.723.

Figure 10:
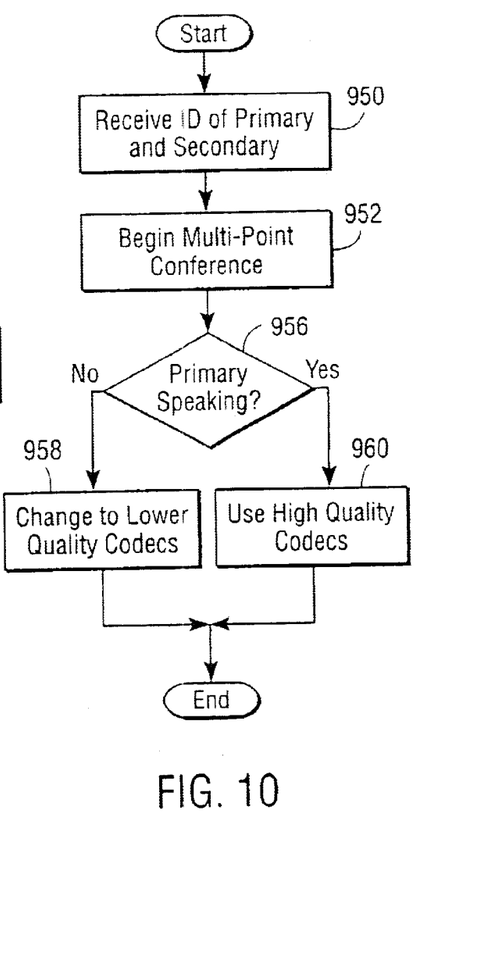
FIG. 10 is a flowchart illustrating operation of another embodiment of the invention.

This process is illustrated in greater detail with reference to FIG. 10. As shown, in a step 950, the TCU 105 receives an identification of a primary and one or more secondary users. In a step 952, the multipoint conference among those users begins. In a step 954, the system determines whether the primary user is speaking. If so, then in a step 960, the highest quality coding is used. If that coding is not currently being employed, then the connections are switched, in a manner similar to that described above. However, if in step 956 a secondary user was speaking, then in a step 958, lower quality codecs are used. If such coding is not currently being employed, then the coding is changed in a manner similar to that described above.

What is claimed is:

1. A multi-point control unit (MCU), comprising:
   a multi-point controller configured to perform call signaling between said MCU and a plurality of client endpoints;
   a multi-point processor configured to perform transcoding between codecs of different types; and
   a transcoding control unit configured to direct said multi-point controller to signal at least one of said plurality of client endpoints to communicate using a predetermined codec so as to minimize an amount of said transcoding according to one or more predetermined criteria.

2. An MCU according to claim 1, wherein said transcoding control unit directs said multipoint controller upon entry of a client endpoint into a multipoint conference.

3. An MCU according to claim 1, wherein said transcoding control unit directs said multipoint controller when a client endpoint begins communication.

4. An MCU according to claim 1, wherein said criteria are to maximize quality.

5. An MCU according to claim 1, wherein said criteria are to minimize transcoding required by said multipoint processor.

6. A multi-point control unit (MCU), comprising:
   means for transcoding among two or more parties to a multi-point conference; and
   means for minimizing an amount of transcoding required to be performed by said transcoding means according to one or more predetermined criteria.

7. An MCU according to claim 6, wherein said optimizing means optimizes upon entry of new parties to a multipoint conference.

8. An MCU according to claim 6, wherein said optimizing means optimizes upon a new party communication.

9. An MCU according to claim 6, said predetermined criteria comprising minimizing an amount of transcoding required to be performed by said transcoding means.

10. An MCU according to claim 6, said predetermined criteria comprising maximizing a coding quality.

11. An MCU according to claim 6, said predetermined criteria comprising assigning one or more of said parties to a predetermined codec and others of said parties to a different codec.

12. A method for teleconferencing, comprising:
    transcoding among two or more parties to a multi-point conference; and
    minimizing an amount of transcoding required to be performed by said transcoding according to one or more predetermined criteria.

13. A method according to claim 12, wherein said optimizing optimizes upon entry of new parties to a multipoint conference.

14. A method according to claim 12, wherein said optimizing optimizes upon a new party communication.

15. A method according to claim 12, said predetermined criteria comprising minimizing an amount of transcoding required to be performed by said transcoding.

16. A method according to claim 12, said predetermined criteria comprising maximizing a coding quality.

17. A method according to claim 12, said predetermined criteria comprising assigning one or more of said parties to a predetermined codec and others of said parties to a different codec.

* * * * *